(12) United States Patent
Harris

(10) Patent No.: US 8,740,255 B1
(45) Date of Patent: Jun. 3, 2014

(54) AIR TOOL HOOK

(71) Applicant: Timothy Allen Harris, Bend, OR (US)

(72) Inventor: Timothy Allen Harris, Bend, OR (US)

(*) Notice: Subject to any disclaimer, the term of this patent is extended or adjusted under 35 U.S.C. 154(b) by 0 days.

(21) Appl. No.: 13/718,133

(22) Filed: Dec. 18, 2012

(51) Int. Cl.
*F16L 3/00* (2006.01)

(52) U.S. Cl.
USPC ............... 285/61; 224/269; 248/301

(58) Field of Classification Search
USPC ............ 285/61; 224/271, 904, 269; 248/211, 248/238, 215, 51, 52, 210, 304, 301
See application file for complete search history.

(56) References Cited

U.S. PATENT DOCUMENTS

| | | | | |
|---|---|---|---|---|
| 3,094,304 A * | 6/1963 | Linder, Jr. | | 248/211 |
| 3,693,863 A * | 9/1972 | Black | | 227/127 |
| 4,154,309 A * | 5/1979 | Sappington | | 173/170 |
| 4,962,873 A * | 10/1990 | Schattel | | 224/904 |
| 5,924,667 A * | 7/1999 | Grahn et al. | | 248/304 |
| 6,010,103 A * | 1/2000 | Ashworth | | 248/301 |
| 6,254,050 B1 * | 7/2001 | Albrecht et al. | | 248/303 |
| 6,511,201 B1 * | 1/2003 | Elrod | | 362/119 |
| 6,557,807 B1 * | 5/2003 | Belanger | | 248/215 |
| 6,679,406 B2 * | 1/2004 | Sakai et al. | | 224/904 |
| 6,722,549 B2 * | 4/2004 | Shkolnikov et al. | | 248/317 |
| 7,231,990 B2 * | 6/2007 | Lai | | 248/301 |
| 7,306,052 B2 * | 12/2007 | Vahabi-Nejad et al. | | 224/268 |
| 7,318,487 B2 * | 1/2008 | Liao | | 224/269 |
| 7,565,989 B2 * | 7/2009 | Lai et al. | | 224/269 |
| 2003/0127577 A1 * | 7/2003 | Brown | | 248/304 |
| 2004/0050888 A1 * | 3/2004 | Warner | | 224/269 |
| 2008/0169395 A1 * | 7/2008 | Bullock | | 248/304 |
| 2009/0278012 A1 * | 11/2009 | Okouchi et al. | | 248/304 |
| 2013/0043295 A1 * | 2/2013 | Gathers | | 224/269 |

* cited by examiner

*Primary Examiner* — David E Bochna
(74) *Attorney, Agent, or Firm* — Thomas Spear; Dekalb & Associates

(57) ABSTRACT

The air tool hook is comprised of a pair of connection fittings for compressed fluids with a first connection on one end of the fitting for connecting a compressed air line and a second connection on the other end of the fitting for attaching a pneumatic tool to the compressed air line, a manifold, wherein one end of the manifold is attached to a side of the fitting and a hole is bored through the other end of the manifold, a hook with one end shaped for hanging the hook and the other end, a straight shaft, sized and shaped to be placed through the hole of the manifold, grooves cut into the shaft, retaining clips attaching the shaft to the manifold, whereby the clips are placed into the grooves of the shaft on either side of the hole, the first and second connections are rotatable, and the hook and shaft are rotatable with respect to the manifold, whereby the air line, the pneumatic tool and the hook are able to rotate independently.

5 Claims, 12 Drawing Sheets

AIR TOOL HOOK

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

This invention relates generally to a pneumatic tool hook that is comprised of an assembly of components that are designed to be placed in line with a compressed air source at one end and a pneumatic tool at the other end with a hook assembly attached to the air line and tool so a tool user can attach the tool and the air line to a hanging appendage for ease of use, safety and ease of access to the tool for the user. The air tool hook or tool hook is situated near the tool and is connected to the compressed air source with various types of connections used with compressed air tools and compressed air lines and known to those skilled in the art. Typically a quick disconnect component with a shaft connects the air line to the tool with compressed air passing through the interior of the shaft and means for connecting the tool hook in line with the compressed air and tool. The shaft body has an appendage herein called the manifold that is perpendicularly connected to the shaft or compressed air line and the manifold is the link between the air line and a hook or similar type device used to hang the line and tool. The hook is used to attach the tool to the top of a ladder or structural frame or other available hanger, such as a hook, clamp, hole or other available object. The hook can be used to support the air line, pneumatic tool or both when a user needs to put down the tool and is not in a place to lay the tool on the ground or other surface. The independent swiveling action of the hook on the manifold with respect to the air line and pneumatic tool make this innovation unique and improves the safety and efficiency for users or pneumatic tools. The universal nature of the air tool hook allows the user to quickly and efficiently substitute various tools while using the same tool hook.

The use of a hook for pneumatic tools is known in the prior art. U.S. Pat. No. 7,231,990 "Limit Structure for a Hook of a Pneumatic Tool" to Lai discloses a hanger and a loop assembly for placement on a pneumatic tool; U.S. Pat. No. 6,010,103, "Hook for Air Guns and Air Nailers", to Ashwort discloses an "L" type hook with a hole on one end of the bent hook for attaching to the compressed air line and pneumatic tool; and U.S. Pat. No. 7,306,052 "Multi-Position Utility Hook Assembly for Tool", to Vahabi-Nejad et al., which discloses a hook assembly that is made part of a power tool including pneumatic tools.

The various hooking devices described and claimed in the prior art have several limitations that the present invention is able to overcome. One limitation found in the prior art is the inability to quickly switch the various pneumatic tools between the various jobs at a construction site without removing the hooking device either on the tool or on the pneumatic line. The present invention provides an inline hooking assembly that allows for quick switching of pneumatic tools from the compressed air while leaving in place the tool hook.

Another limitation of the prior art is the lack of versatility for the various pneumatic tools used at a construction site. The present invention is able to be used with a wide variety of pneumatic tools and provides an easy means for switching between the various tools. The present invention allows the user to attach a pneumatic tool onto the compressed air line and adjust the center of mass of the tool as the tool is hung on any available object or surface structurally capable of supporting the air line and tool, such as a ladder rung. For example, some tools have a center of mass that is not centrally located within the dimensions of the tool, like a tool that has an appendage or weighted on one side or end of the tool. The present invention allows the worker to adjust the location of the hook with respect to the compressed air line such that the center of mass for any particular tool permits the user to safely hang the tool and minimized any swing or sway once it is hung up.

Another limitation of the prior art is the aspect in which the tools are hung. Some of the hooking devices limit how the tool can be hung, such as bottom down, top down, handle down, handle up or other various positions that make hanging the tool unsafe or awkward for retrieval. When a worker is reaching or grabbing for a tool, the worker may be limited in their movement or restricted in their ability to move. The worker would like to be able to hang the tool and then be able to reach for the tool in the safest and easiest manner. The prior art provides for placements of hooking devices without the ability to adjust or change the way in which a worker could hang the tool when not in use. The present invention allows the worker to set the hook either toward or away from the tool and adjustments of the hook allow for the tools center of mass to be balanced at the best or better position for the worker's safety and ease of use. For example, a particular tool may be hung such that the handle of the tool is located on the underside of the tool and therefore the hook is best place away from the handle if the worker is grabbing or reaching for the tool from above or below the workers arms. If the tool is to be hung above the worker the hook can be placed toward the tool and the handle is easier to grab. The placement of the hook either toward or away from the tool can be changed depending on how the worker is grabbing or reaching for the tool.

Another limitation of the prior art is the limited means for attaching a hooking device for the various types of pneumatic tools. There is a variety of connecting devices or fittings for pneumatic tools and each type of fitting requires a different type of connection. The present invention allows for a variety of connection fittings to be used with the air hook and allows for switching the connection depending upon the type of fitting on the particular tool or air line fitting.

BRIEF SUMMARY OF THE INVENTION

An air tool hook is a separate component placed between a compressed fluid line, typically a compressed air line, and a pneumatic tool that is easily inserted between the line and the tool and provides a rotational hooking device for safely placing the line and the tool in a place for the user to hang and retrieve.

The air tool hook is comprised of a pair of connection fittings for compressed fluids with a first connection on one end of the fitting for connecting a compressed air line and a second connection on the other end of the fitting for attaching a pneumatic tool to the compressed air line, a manifold, wherein one end of the manifold is attached to a side of the fitting and a hole is bored through the other end of the manifold, a hook with one end shaped for hanging the hook and the other end, a straight shaft, sized and shaped to be placed through the hole of the manifold, grooves cut into the shaft, retaining clips attaching the shaft to the manifold, whereby the clips are placed into the grooves of the shaft on either side of the hole, the first and second connections are rotatable, and the hook and shaft are rotatable with respect to the manifold, whereby the air line, the pneumatic tool and the hook are able to rotate independently.

The present invention provides an in line support hook for a variety of pneumatic tools. The air tool hook is designed to allow for quick transitions from one tool to another with the ability to adjust the hook to allow the worker to safely hang the tool for working on ladders or restricted work spaces. The air tool hook allows the worker to adjust the hook such that the worker is able to easily reach or grab the tool and for adjusting the way in which the tool is hung. The air tool hook is comprised of a connection for the compressed air line, a connection for the pneumatic tool, a body or shaft between the two connections in which compressed air passes, a manifold connected to the outside of the shaft that has a means for connecting a hook to the manifold such that the hook position can be adjusted with respect to the compressed air line and pneumatic tool. The connections for the air tool hook to the compressed air line can be either a male or female fitting or either a threaded, fixed, or quick release type of fitting used with compressed air or compressed fluid systems. The connections on the tool hook to the pneumatic tool can be a male or female fitting with either a threaded, fixed, or quick release type of fitting. In one embodiment of the present invention, a ball and socket connection can be placed on either or both ends of the air tool hook and the air line or tool is able to move depending on the direction in which the air tool hook is moved.

The body of the air tool hook is typically a pair of quick disconnect fitting with a first and second connection between the air line and the tool. On one side of the quick disconnect is a manifold that is affixed perpendicular to a shaft that runs through the quick disconnect, connecting the compressed air to the tool. The manifold is an appendage in which one end is connected to the shaft and there is a means for attaching a hook to the manifold. The hook consists of the stem and the U portion with the U portion used to hang the tool and the arm being connected to the manifold.

In one embodiment for attaching the hook to the manifold a pair of retaining clips are used to connect the hook to the manifold. Or in another embodiment, the manifold has a clamp similar to those found on bike seats allowing the user to quickly adjust the hook by adjusting the length of the arm or the direction of the hook and setting the position with a clamp type device that can be set by the user.

DETAILED DESCRIPTION OF THE INVENTION

Various embodiments of the invention will now be described. The following descriptions provide specific details for a thorough understanding and enabling description of these embodiments. Additionally, some well-known structures or functions may not be shown or described in detail, so as to avoid unnecessarily obscuring the relevant description of the various aspects and embodiments of the invention.

The terminology used in the description presented below is intended to be interpreted in its broadest reasonable manner, even though it is being used in conjunction with a detailed description of certain specific embodiments of the invention. Certain terms may even be emphasized herein; however, any terminology intended to be interpreted in any restricted manner will be overly and specifically defined as such in this Detailed Description section.

FIGS. 1, 3, 7, 9 and 11 depict several types of the air tool hooks for connecting and hanging a pneumatic air tool and an attached air supply line or hose. The various types of air tool hooks described below have similar components with a variety of fittings and connections that are used for connecting to the air supply (not shown) and pneumatic tools (not shown). The present invention is meant to take into consideration the fact that there are many types of air supply connections and fittings on pneumatic tools for the air supply. The present invention is meant to provide various types of fittings for the various types of connections, covering a variety of connection types. The below description is not meant to limit the various combinations that can be deployed in the present invention and known to those skilled in the art of pneumatic or hydraulic tool and compressed fluids.

Figure 1:
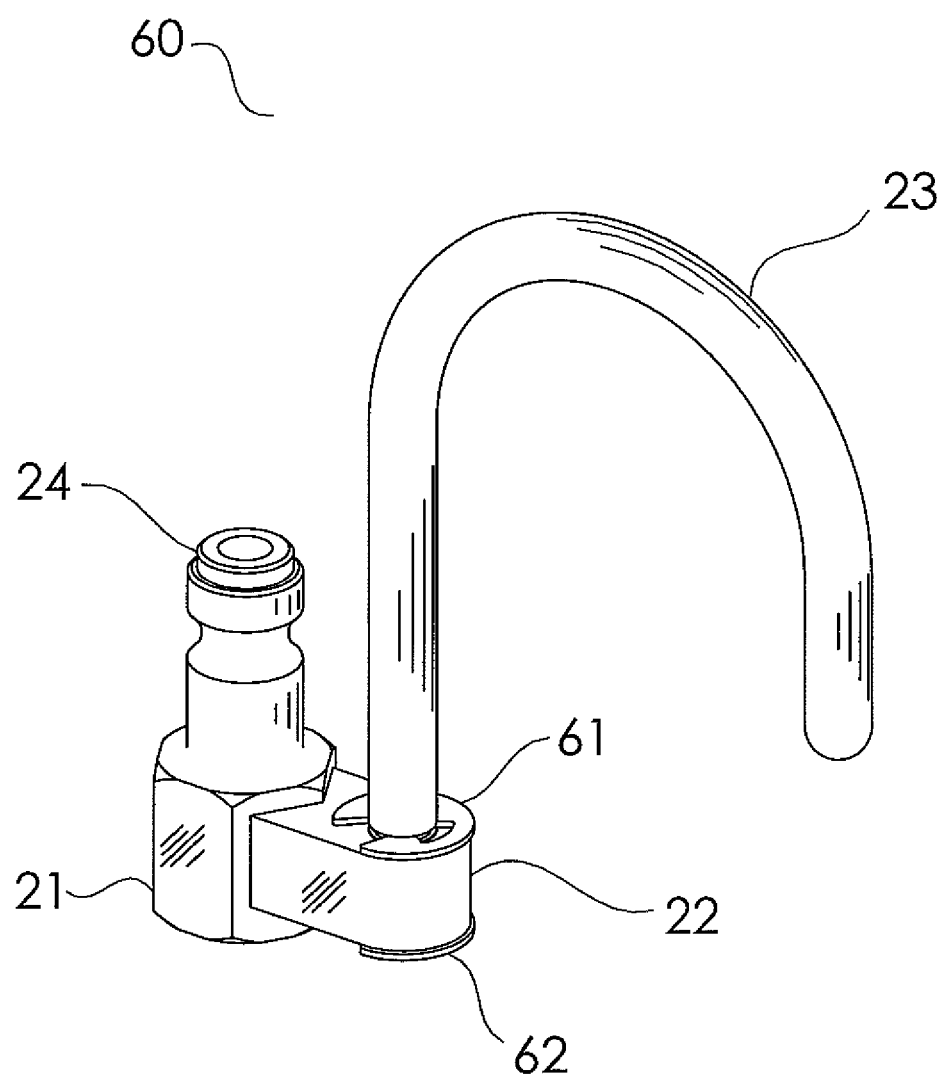
FIG. 1 is a top side perspective view of the air tool hook with a male quick release connection fitting on top and a threaded connection fitting on the bottom of the pair of connection fittings and a pair of retainer clips connecting the hook to a manifold which is attached to the pair of connection fittings.

In FIG. 1 an air tool hook 60 is shown. The body of the air tool hook is comprised of a pair of connection fittings 21 and 24, the type of fittings which are known to those skilled in the art of pneumatic tools, hydraulic tools and compressed air or compressed fluids systems. Most connection fittings are described as quick disconnect fittings, threaded connections or compression connections and are defined as fittings that allow an operator or user to quickly connect or disconnect a tool to a compressed air line. The term quick disconnect fittings used in this application covers the types of connections described and shown in the various figures and are known to those skilled in the art of hydraulic fluids.

The air tool hook or tool hook is a portable and removable connection device between the compressed air source and the pneumatic tool. The connection fittings in the various embodiments have a first connection 21 and a second connection 24. The first connection connects the air line, not shown, to a female threaded connection fitting 21 and is designed to attach to the compressed air line. The second connection 24 connects the compressed air to a pneumatic tool, not shown. The connection fittings are designed for easy attachment and removal from both the air line and the pneumatic tool. The quick disconnects used in the variety of embodiments described below are all able to swivel or rotate while maintaining the integrity of the high pressure air or fluid. These types of connections, quick disconnect fittings that swivel or rotate, are not novel and are currently used by those who operate pneumatic tools. When integrated between the compressed air line and the pneumatic tool, the connection fittings permits high pressure air, or fluids, to flow to the tool without escaping to the environment or disrupting system air pressure—the compressed air system comprising the compressed air line, the connection fittings and the pneumatic tool.

In FIG. 1, the air tool hook, 60 has a pair of connection fittings 21 and 24. A female threaded first connection 21 and a male quick disconnect 24 on opposite ends of the connection fittings. In the embodiment shown in FIG. 1, the first connection is a female threaded connection fitting and the second connection is a male quick disconnect connection fitting, both types of connection fittings are commonly used in compressed air or hydraulic systems. Attached to the connection fittings is a manifold 22 that is attached perpendicular to the connection fittings. On the end of the manifold opposite the connection fittings is a hole. The opening of the hole is in line with the air line, fittings and pneumatic tool.

Figure 2:
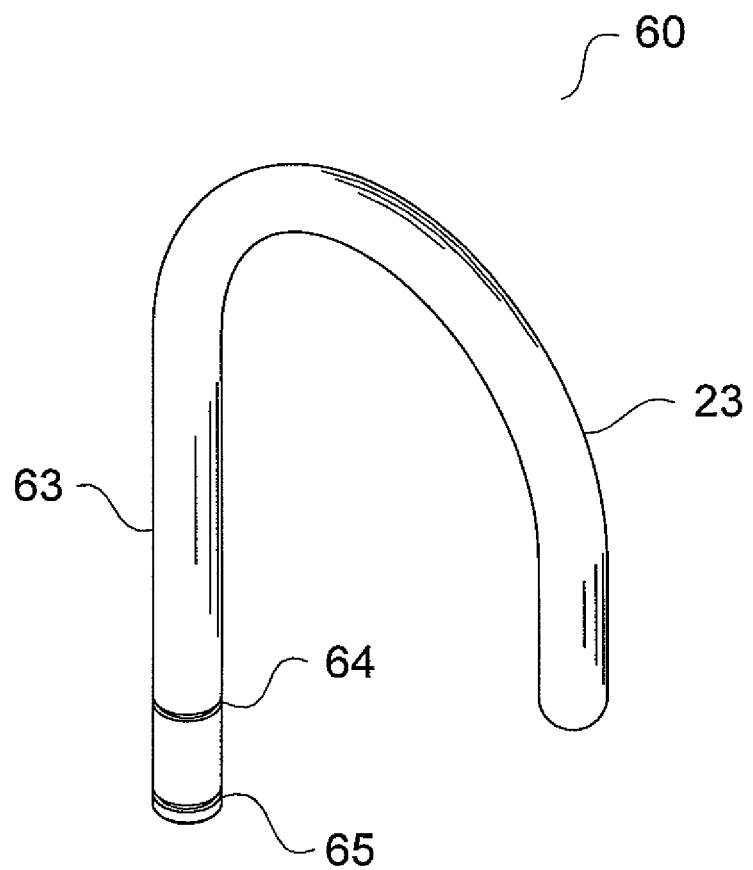
FIG. 2 is a perspective view of the hook with a pair of grooves placed in the stem of the hook for attaching the hook to the manifold with retainer clips.

From FIGS. 1 and 2, a hook 23 has a stem 63 on the opposite end of the hook portion of the hook. Near the end of the stem are two grooves or cuts made into the stem, an upper groove 64 and a lower groove 65. When the stem is inserted into the hole of the manifold, the grooves are aligned above and below the hole and an upper retaining clip 61 is inserted around the upper groove and a lower retaining clip 62 is inserted around the lower groove. The clips are sized and shaped to retain the hook in place with respect to the manifold. The hook 23 is able to rotate in the hole of the manifold as well.

An operator uses the air tool hook by attaching the air tool hook between the compressed air line and the pneumatic tool. When the operator is not using the pneumatic tool, it is sometimes necessary to let go of the tool to perform other tasks the operator needs to accomplish. Often times the operator cannot lay the tool down on the ground or on a horizontal surface, either because the operator is on a ladder or a position that does not allow laying the tool down. With the air tool hook, the operator places the hook of the air tool hook onto a ladder rung, nail, or projection that is able to support the weight of the air tool hook, the compressed air line and pneumatic tool. If necessary, the operator can rotate the hook to a position that allows easy hanging or retrieval of the pneumatic tool.

Figure 3:
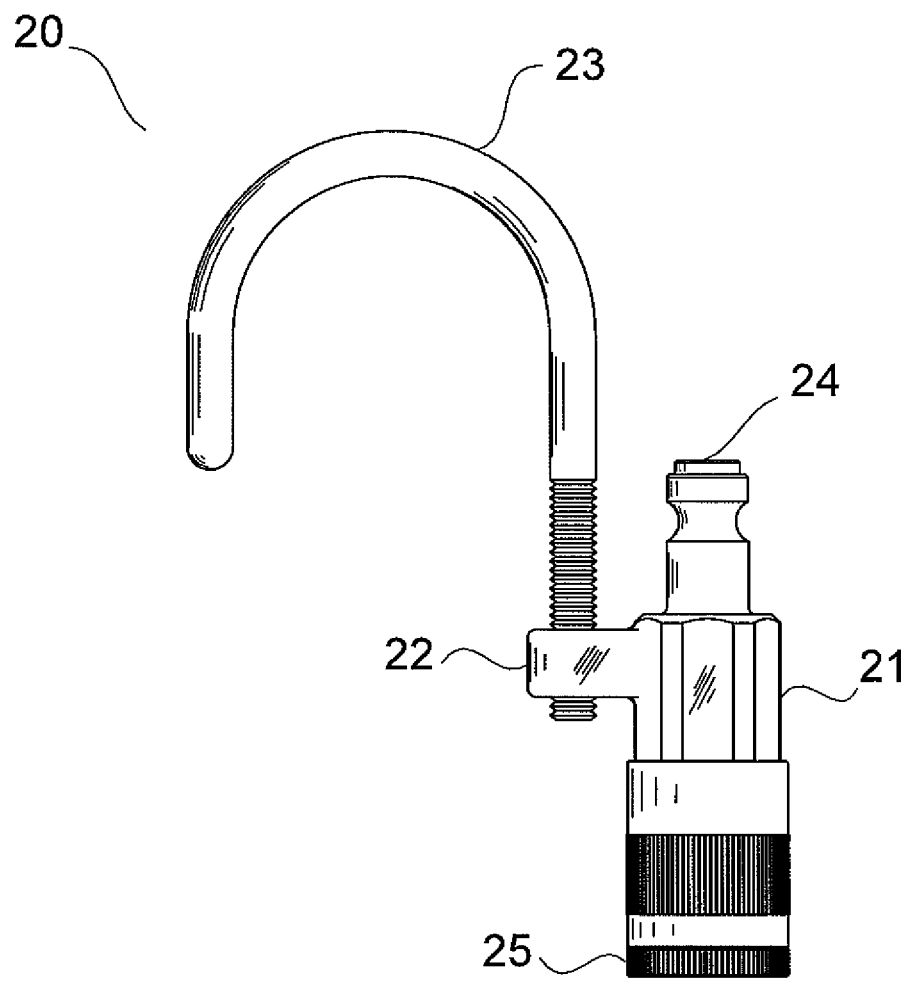
FIG. 3 is a side view of air tool hook with a male quick release connector on top and a female quick release connector on the bottom with a threaded stem connecting the hook to the manifold.

In FIG. 3, the pair of connection fittings has an upper 24 and lower 25 quick disconnect fitting, a manifold 22 attached perpendicular to the quick disconnect fittings, a threaded hole at the opposite end of the quick disconnect fitting, and a hook threaded through the hole of the manifold. On the bottom of the quick disconnect fitting, a quick release female connection 25 is located. The female fitting has a slidable outer body that is moved toward the top of the tool hook when attaching the quick release fitting to a quick release male fitting—on the air supply, not shown, and then slid down over the male fitting for the connection. In the embodiment of FIGS. 1 and 3, the upper quick disconnect fitting is a male quick disconnect fitting. From the description provided above, a female quick disconnect fitting attached to the tool would then connect to the quick disconnect fitting 24, pneumatic tool and quick disconnect fitting are not shown.

It should be noted that the above description with the pneumatic tool connected to the second connection fitting 24 in FIGS. 1 and 3 could be reversed with the compressed air or fluid connected to the second connection fitting, the male quick disconnect fitting 24, and the pneumatic tool connected to the first connection fitting, the threaded female threaded fitting 21 shown in FIG. 1 and the female quick disconnect fitting 25 shown in FIG. 3. The variety of connection fittings that can be used with the air tool hook are numerous and allow the user to quickly connect and disconnect various pneumatic tools with the compressed air supply or line.

Figure 4:
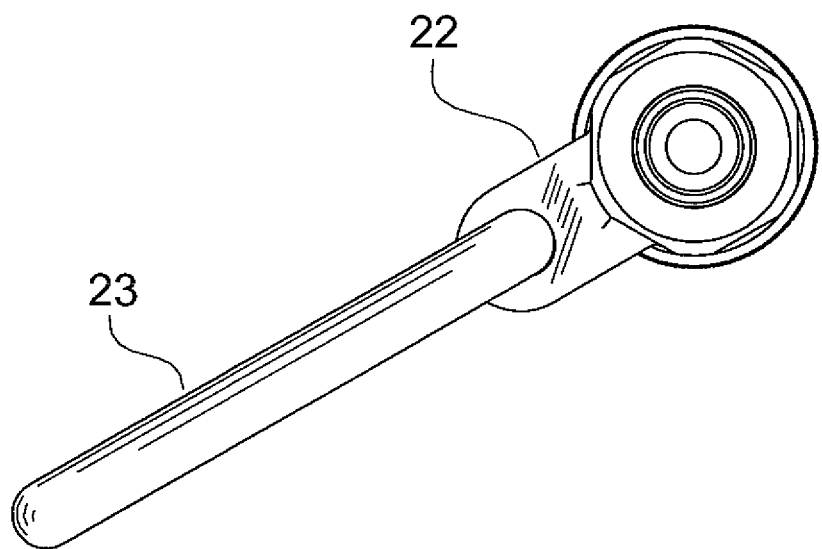
FIG. 4 is top view of the tool hook of FIG. 3.
Figure 5:
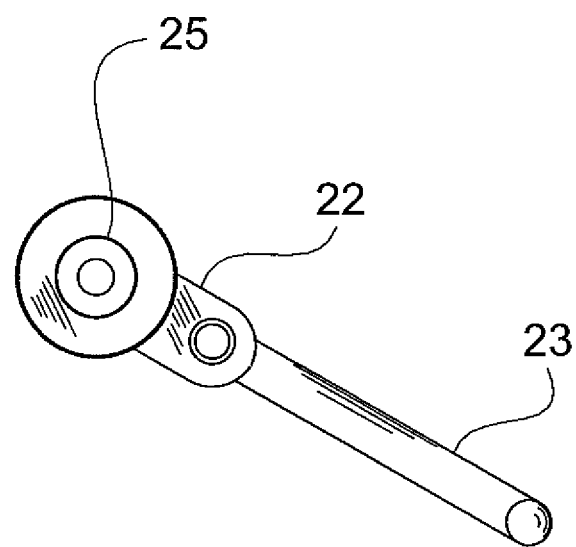
FIG. 5 is a bottom view of the tool hook of FIG. 3.
Figure 6:
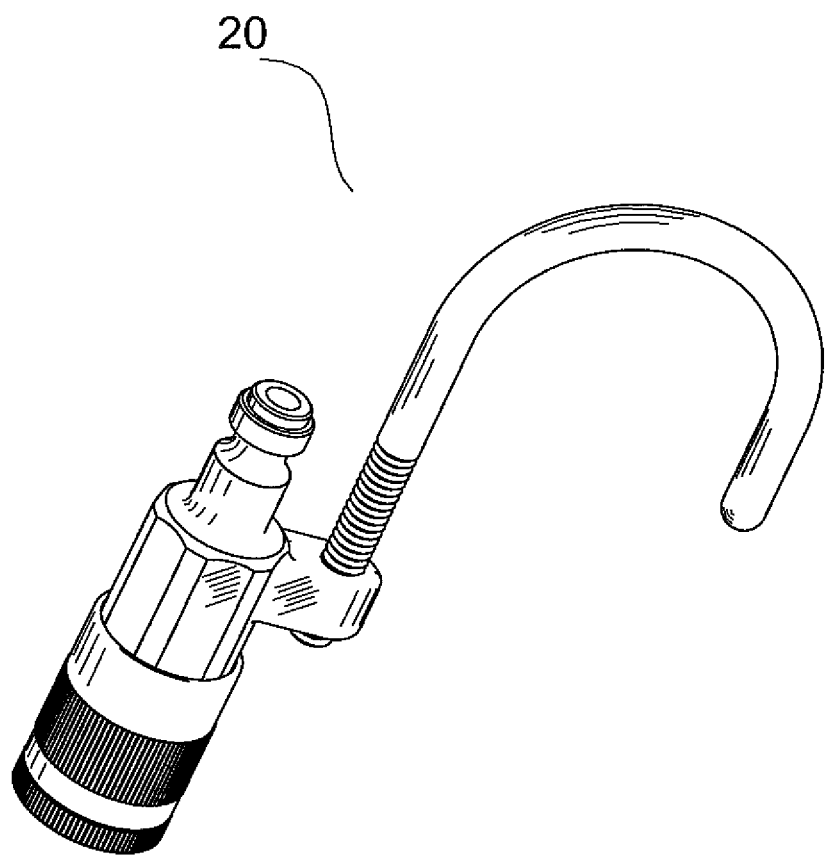
FIG. 6 is a top side perspective view of the tool hook of FIG. 3.

FIG. 4 is top view of the air tool hook 20 of FIG. 3. The hook 23 is pointed 180 degrees from the air line—not shown. FIG. 5 is a bottom view of the tool hook of FIG. 3 with the quick connect female connector 25 shown and the manifold 22 and hook 23 projecting away from the quick disconnect.

Depending on the location of the center of mass for the particular tool that is connected the user of the tool hook can adjust the position of the U on the tool hook. The U can be placed closer to the manifold by turning the threads of the hook further onto the manifold on FIG. 3 or positioning the hook by rotating the hook in FIG. 1. Additionally the U can be placed in any direction or 360° with respect to the air line, shaft and tool. In all of the embodiments shown, the hook is free to rotate in the manifold as well. If the user desires, the hook can be turned toward the tool by removing the hook from the manifold and then threading the hook on the opposite side of the manifold or toward the tool from the description above or as shown on FIG. 3. The placement of the hook allows the user to position the tool in the most convenient location depending on the type of tool and the working location. The connection fittings allow the worker to conveniently replace or switch the type of tool to be used with the tool hook; or, different compressed air sources can be switched or replaced simply by disconnecting the air source from the connection fitting and replacing with another compressed air source.

The ease in which the user can change either tool or air source makes the present invention an improvement from the prior art. The swiveling hook on the manifold and the ability to adjust the center of mass when the tool is hanging from the hook make the use of the air tool hook an improvement from the prior art and provides a safer means for hanging and retrieving a tool for workers on ladders or places that restrict the workers ability to move about.

Figure 7:
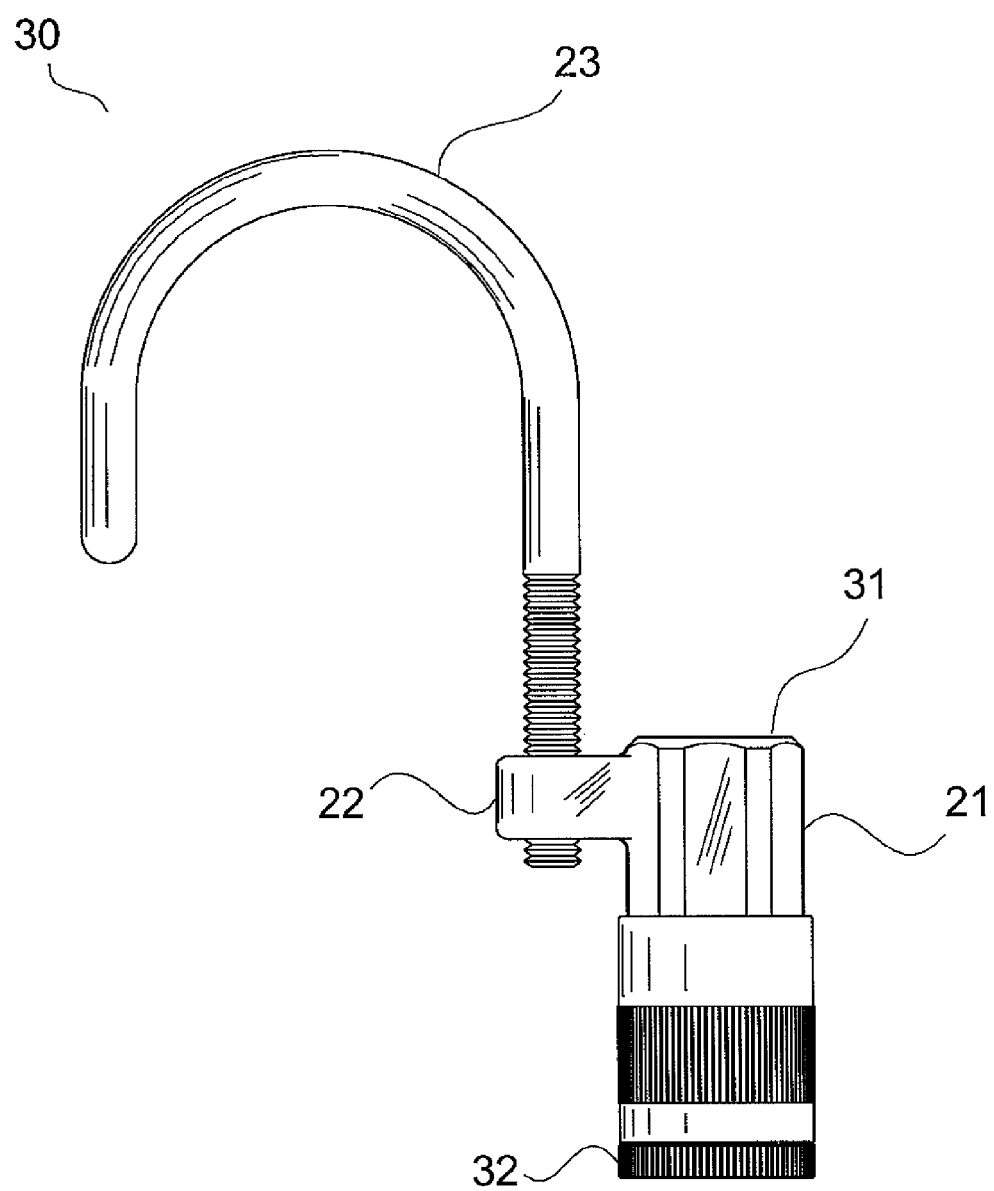
FIG. 7 is side view of a tool hook with a threaded connector on top and a female quick release on the bottom.

In FIG. 7 the tool hook 30 has a female threaded connector 31 located on top of the quick disconnect fitting 26 and a quick release female connector 32 located on the bottom of the shaft. The quick disconnect fitting 26, manifold 22, and hook 23 are the same as used in the tool hook of FIG. 3. In this air tool hook the air supply connector fitting, not shown, would be a male quick disconnect fitting connection which would connect to the female quick connect fitting and the pneumatic tool connection would be a threaded male connection.

Figure 8:
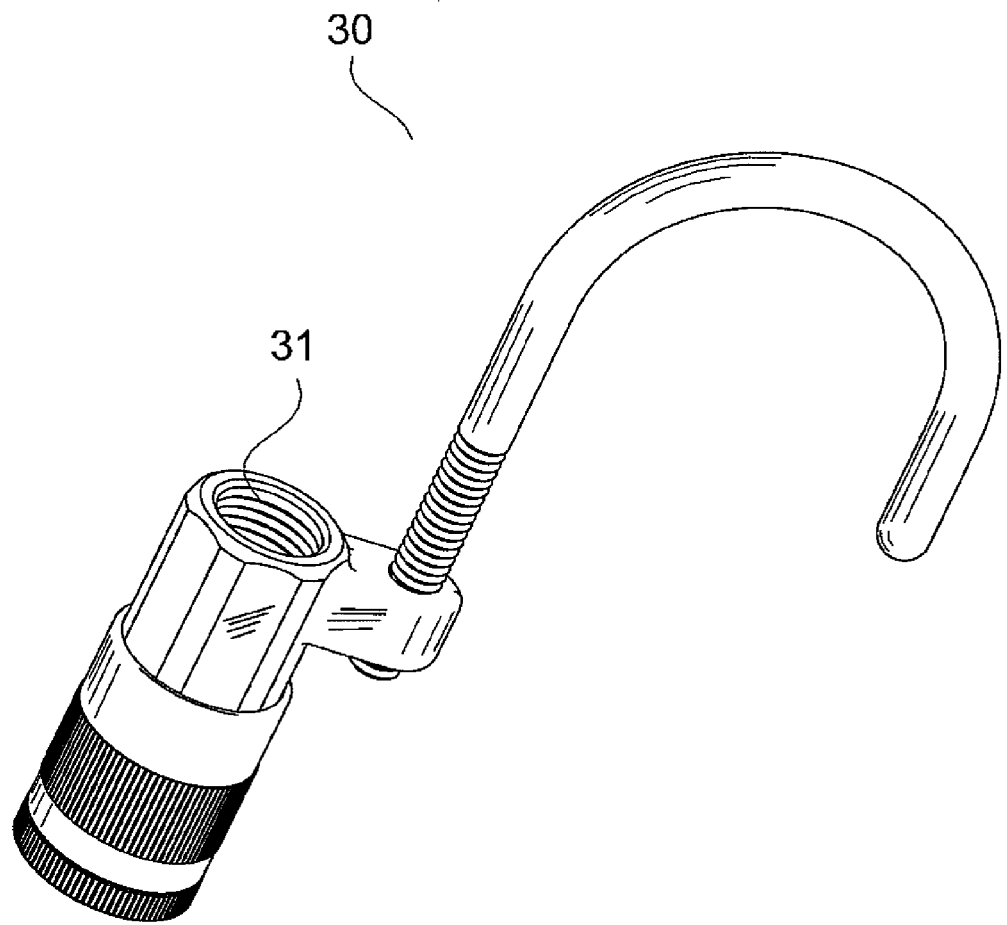
FIG. 8 is a top side perspective of the tool hook of FIG. 7.

The hook can be adjusted, allowed to swivel or repositioned so the hook is pointed toward the tool as described above. FIG. 8 depicts a perspective view of the tool hook from FIG. 7 with the female threaded top connector spotlighted.

Figure 9:
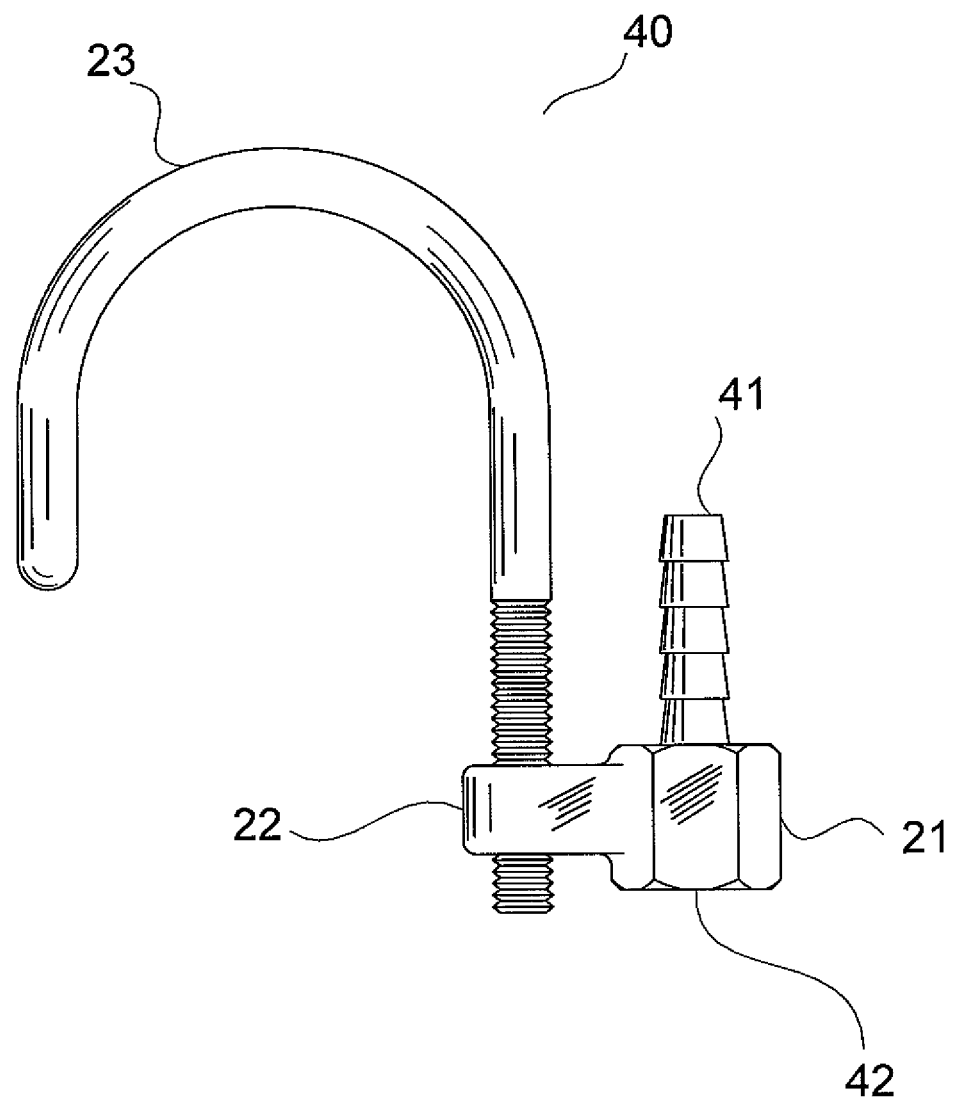
FIG. 9 is a side view of an tool hook with a fixed male connector fitting on top and a threaded female fitting on the bottom.
Figure 10:
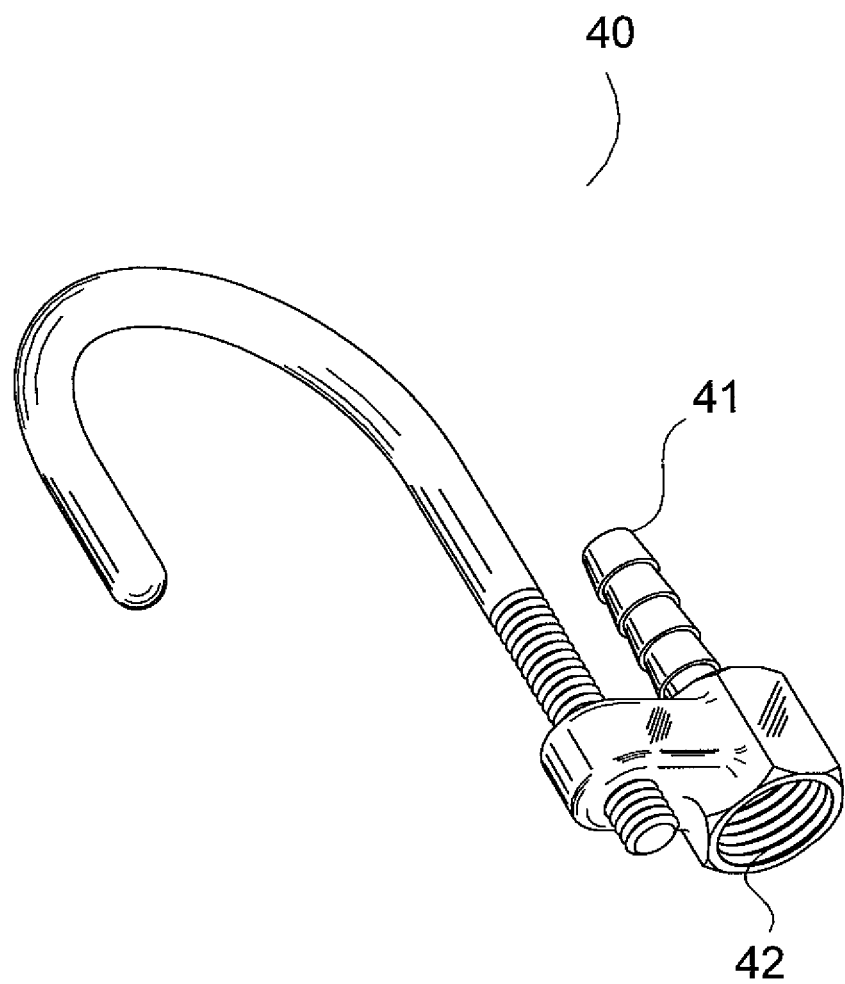
FIG. 10 is bottom side perspective view of the tool hook of FIG. 9.

In FIG. 9, the air tool hook 40 has a push-on hose barb connector 41 and a female threaded bottom connector 42. FIG. 10 is bottom perspective of the tool hook of FIG. 9 exposing the female threading. The pair of connection fittings 41 and 42 of this particular tool hook is shorter and provides enough length on the shaft, or air passage, for the manifold 22 to be attached. The hook 23 is attached to the manifold as described above with the threaded stem inserted into the threaded hole of the manifold. It should be noted the retaining clip design shown in FIG. 1 could be used for connecting the hook to the manifold and this embodiment shows just one of many combinations that can be used for connecting the hook to the manifold and the various connection fittings.

Figure 11:
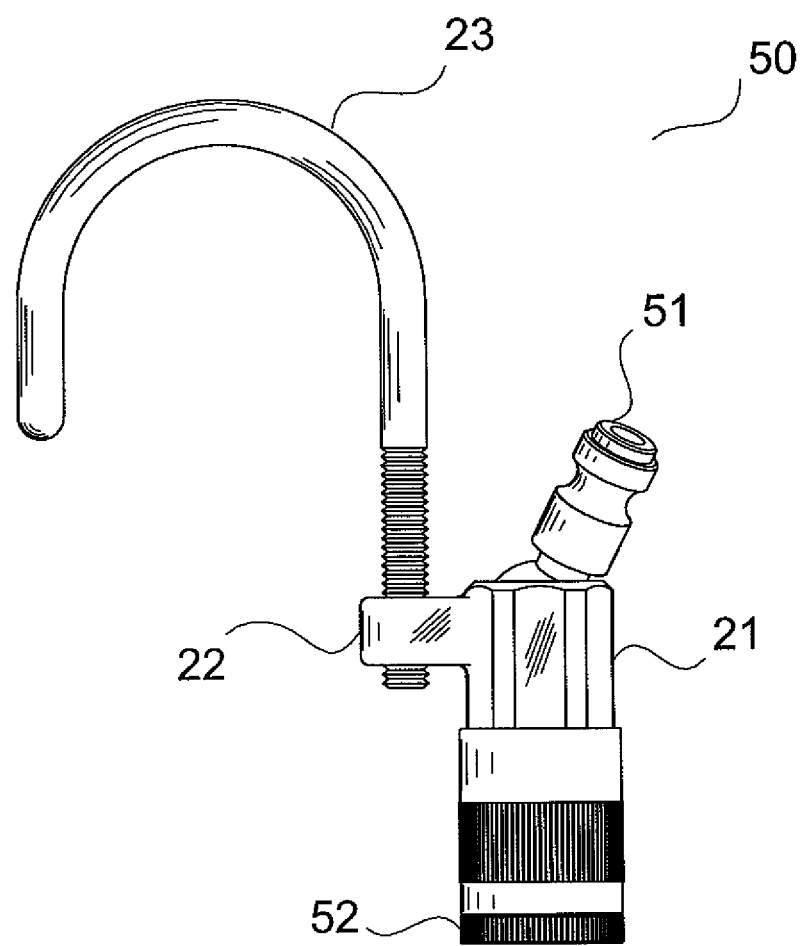
FIG. 11 is a side view of an tool hook with a ball and socket quick release male fitting on the top and a quick release female fitting on the bottom.
Figure 12:
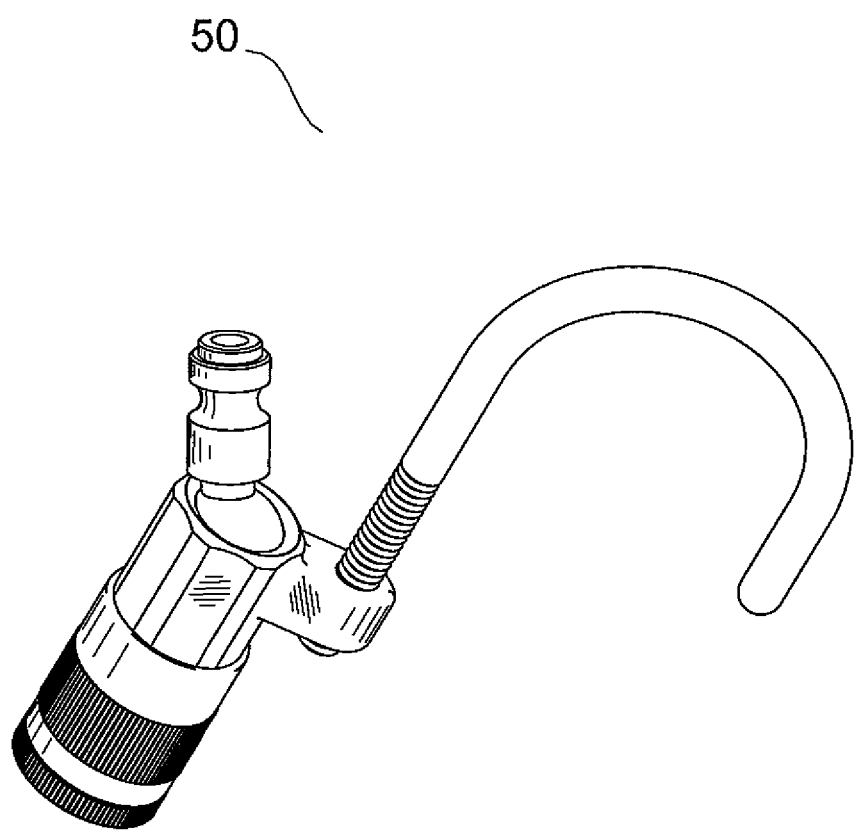
FIG. 12 is a top side perspective view of the tool hook of FIG. 11.

In FIG. 11, the tool hook 50 has a ball and socket male connector 51 for the top connection fitting and a quick release female connection fitting 52 located on the bottom. The manifold 22 and hook 23 are the same as in FIG. 3. In this configuration, the air supply line—not shown—would be connected to the upper connection fitting and would be able to move about when the tool hook is moved, providing less tension on the tool line as the user moves about.

Another aspect of the present invention, not shown in the figures, is the ability to change or provide another profile other than the rounded hook shown in the various figures and instead providing a square hook or angular hook profile. The hook profile can be interchanged depending on the type of tool to be used or the location the hook is to be hung.

Another embodiment of the air tool hook, not shown in the figures, is to place the manifold with the swiveling or rotating hook directly onto the compressed air supply or the pneumatic tool. The manifold could be attached at the end of the compressed air line as shown in FIGS. 1, 3, 7, 9, and 11. The pneumatic tool would attach to the compressed air line as described and the tool hung or positioned for the best use of the operator of the tool.

I claim:

1. An air tool hook comprising; a connecting fitting with a first connection on one end of the fitting for connecting a compressed air line and a second connection on the other end of the fitting for attaching a pneumatic tool to the compressed air line, with compressed fluid able to pass from one end to the other,
  a manifold, wherein one end of the manifold is attached to a side of the fitting and a hole, bored through the other end of the manifold,
  a hook with one end shaped for hanging the hook and the other end, a straight stem, sized and shaped to be placed through the hole of the manifold,
  grooves cut into the stem,
  retaining clips attaching the stem of the hook to the manifold, whereby the clips are placed into the grooves of the stem on either side of the hole,
  the first and second connections are rotatable, and
  the hook and stem are rotatable with respect to the manifold,
  whereby the air line, the pneumatic tool and the hook are able to rotate independently of each other.

2. The air tool hook of claim 1 wherein the fittings are quick disconnect fittings.

3. The air tool hook of claim 1 further comprising the first and second connection fittings are threaded male or female connection fittings.

4. The air tool hook of claim 1 further comprising the first or second connections fittings are push-on barbs or receptacle for a push-on barb connection fittings.

5. The air tool hook of claim 1 wherein the fittings are selected from one of a quick disconnect fitting, threaded fitting, or push-on fitting.

* * * * *